(12) United States Patent
Oonishi

(10) Patent No.: US 11,703,038 B2
(45) Date of Patent: Jul. 18, 2023

(54) POWER CONTROL CIRCUIT, POWER GENERATOR, AND POWER GENERATION SYSTEM

(71) Applicant: KABUSHIKI KAISHA TOSHIBA, Tokyo (JP)

(72) Inventor: Atsuro Oonishi, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 633 days.

(21) Appl. No.: 16/802,710

(22) Filed: Feb. 27, 2020

(65) Prior Publication Data
US 2021/0079900 A1    Mar. 18, 2021

(30) Foreign Application Priority Data
Sep. 17, 2019    (JP) .................... 2019-168331

(51) Int. Cl.
| | | |
|---|---|---|
| *H02J 1/14* | (2006.01) | |
| *H02J 50/30* | (2016.01) | |
| *F03G 7/08* | (2006.01) | |
| *G01P 15/08* | (2006.01) | |
| *H01H 35/14* | (2006.01) | |
| *H02M 5/44* | (2006.01) | |
| *H02K 7/18* | (2006.01) | |
| *H02K 35/00* | (2006.01) | |
| *H02P 23/14* | (2006.01) | |
| *H02P 9/00* | (2006.01) | |

(Continued)

(52) U.S. Cl.
CPC .............. *F03G 7/08* (2013.01); *G01P 15/08* (2013.01); *H01H 35/144* (2013.01); *H02K 7/1892* (2013.01); *H02K 11/05* (2016.01); *H02K 35/00* (2013.01); *H02M 5/44* (2013.01); *H02N 2/18* (2013.01); *H02P 9/006* (2013.01); *H02P 23/14* (2013.01); *H02M 1/0003* (2021.05)

(58) Field of Classification Search
CPC ................. H02P 3/12; H02P 9/00; H02P 6/04
See application file for complete search history.

(56) References Cited

U.S. PATENT DOCUMENTS 9,991,715 B1 * 6/2018 Huang .................... H02M 1/08
10,411,612 B2    9/2019 Oonishi et al.
(Continued)

FOREIGN PATENT DOCUMENTS

JP         5405127 B2    2/2014
JP      2017-229118 A   12/2017
(Continued)

*Primary Examiner* — Kawing Chan
*Assistant Examiner* — Charles S Laughlin
(74) *Attorney, Agent, or Firm* — Finnegan, Henderson, Farabow, Garrett & Dunner, LLP

(57) ABSTRACT

According to one embodiment, a power control circuit includes a converter, a signal generating circuit, an estimation unit, and a controller. The converter includes a switching circuit and is configured to transform an output voltage from a power generator. The signal generating circuit is configured to transmit a signal to the switching circuit. The estimation unit is configured to determine a switching operation condition based on vibration information indicative of a vibration applied to the power generator. The controller is configured to control an operation of the switching circuit based on the determined switching operation condition.

11 Claims, 5 Drawing Sheets

(51) Int. Cl.
*H02N 2/18* (2006.01)
*H02K 11/05* (2016.01)
*H02M 1/00* (2006.01)

(56) References Cited

U.S. PATENT DOCUMENTS

| | | |
|---|---|---|
| 2007/0210580 A1 | 9/2007 | Roberts et al. |
| 2011/0156532 A1* | 6/2011 | Churchill .................. G01L 1/26 |
| | | 310/319 |
| 2013/0181689 A1* | 7/2013 | Ocalan ................... H02N 2/181 |
| | | 322/3 |
| 2016/0087532 A1* | 3/2016 | Stanzione ............. H02M 3/156 |
| | | 323/271 |
| 2017/0366077 A1 | 12/2017 | Oonishi et al. |
| 2019/0028049 A1 | 1/2019 | Oonishi et al. |
| 2019/0058242 A1* | 2/2019 | Tabe ....................... H01Q 1/248 |
| 2019/0379227 A1 | 12/2019 | Oonishi et al. |
| 2021/0135601 A1* | 5/2021 | Zhang ................. H01L 41/1136 |

FOREIGN PATENT DOCUMENTS

| | | |
|---|---|---|
| JP | 2018-157724 A | 10/2018 |
| JP | 2019-22409 A | 2/2019 |
| JP | 2019-216584 A | 12/2019 |

* cited by examiner

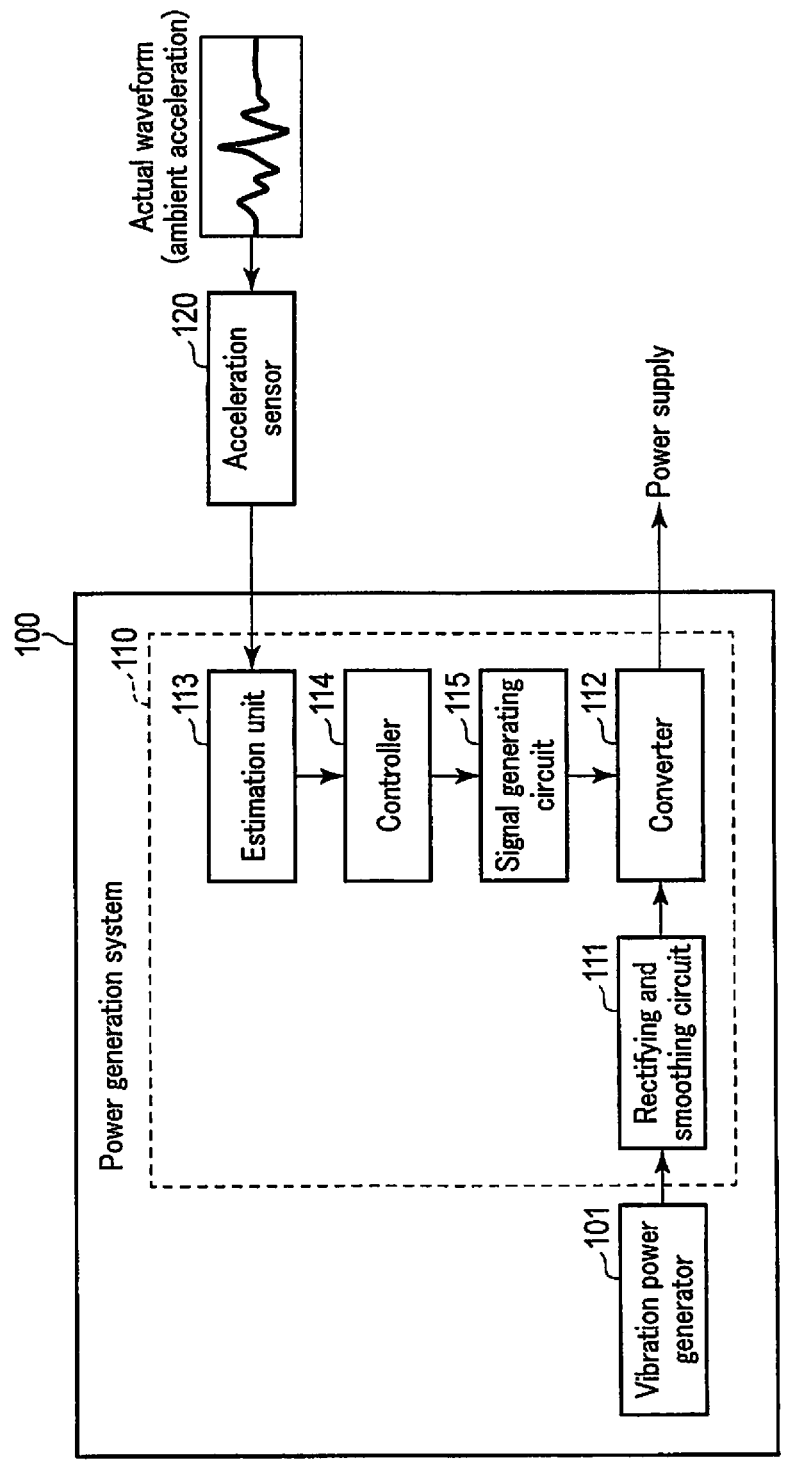
F I G. 1

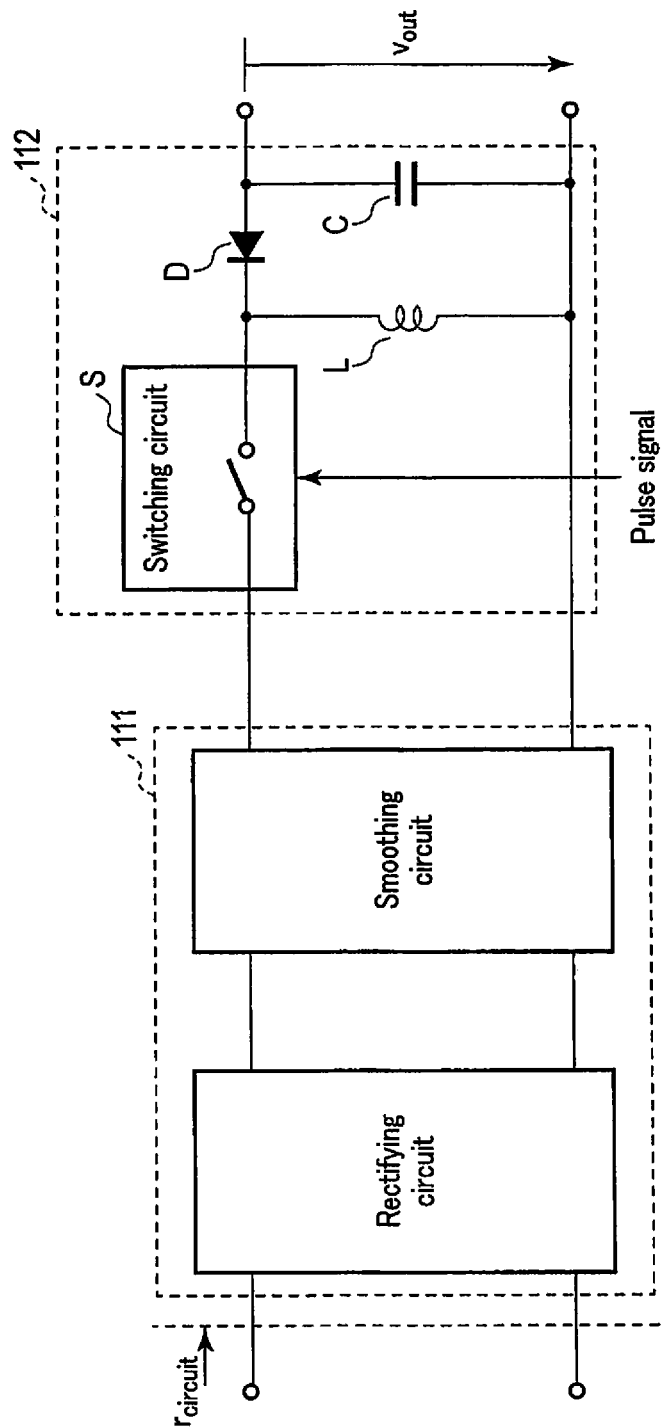
F I G. 2A

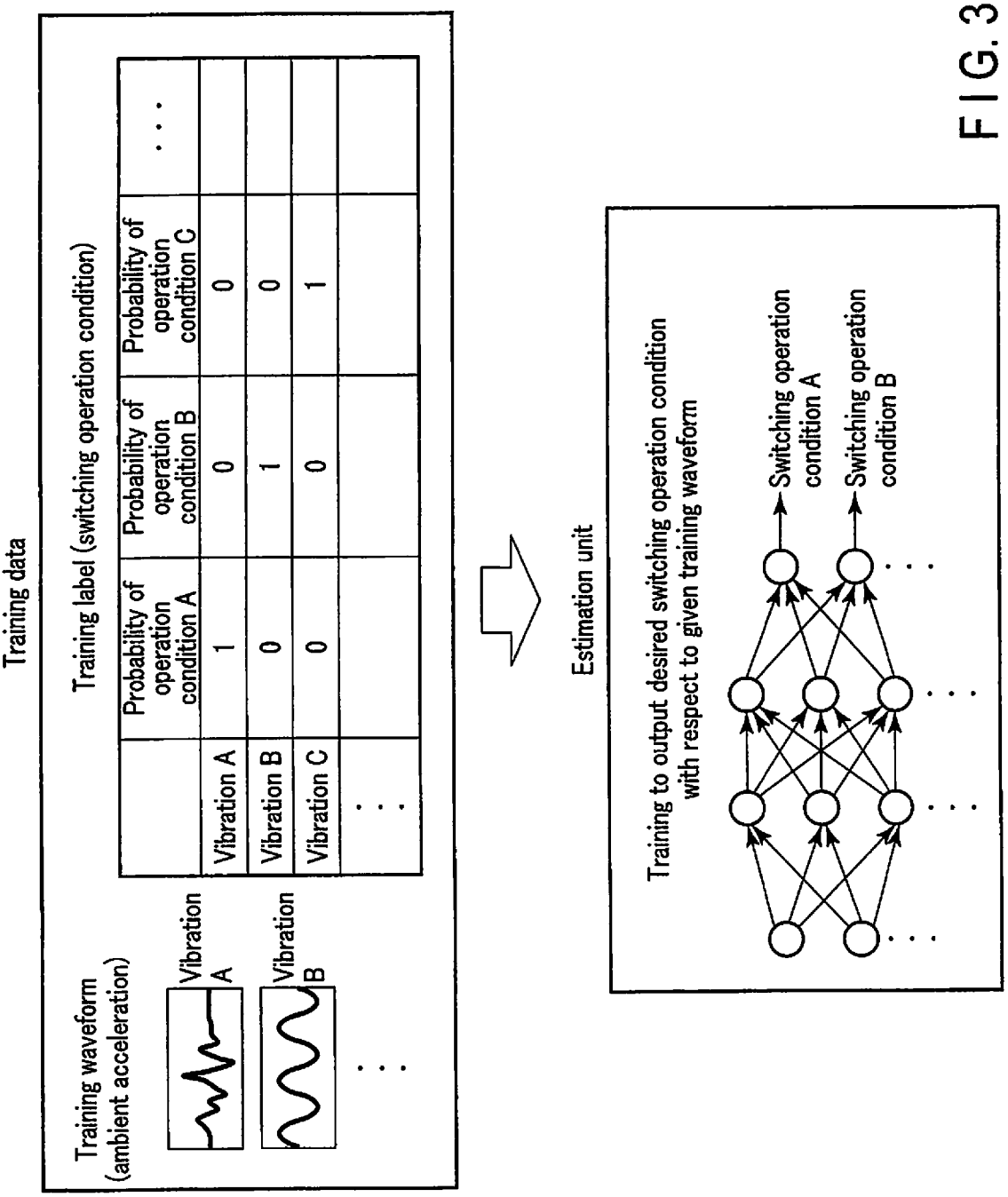
F I G. 3

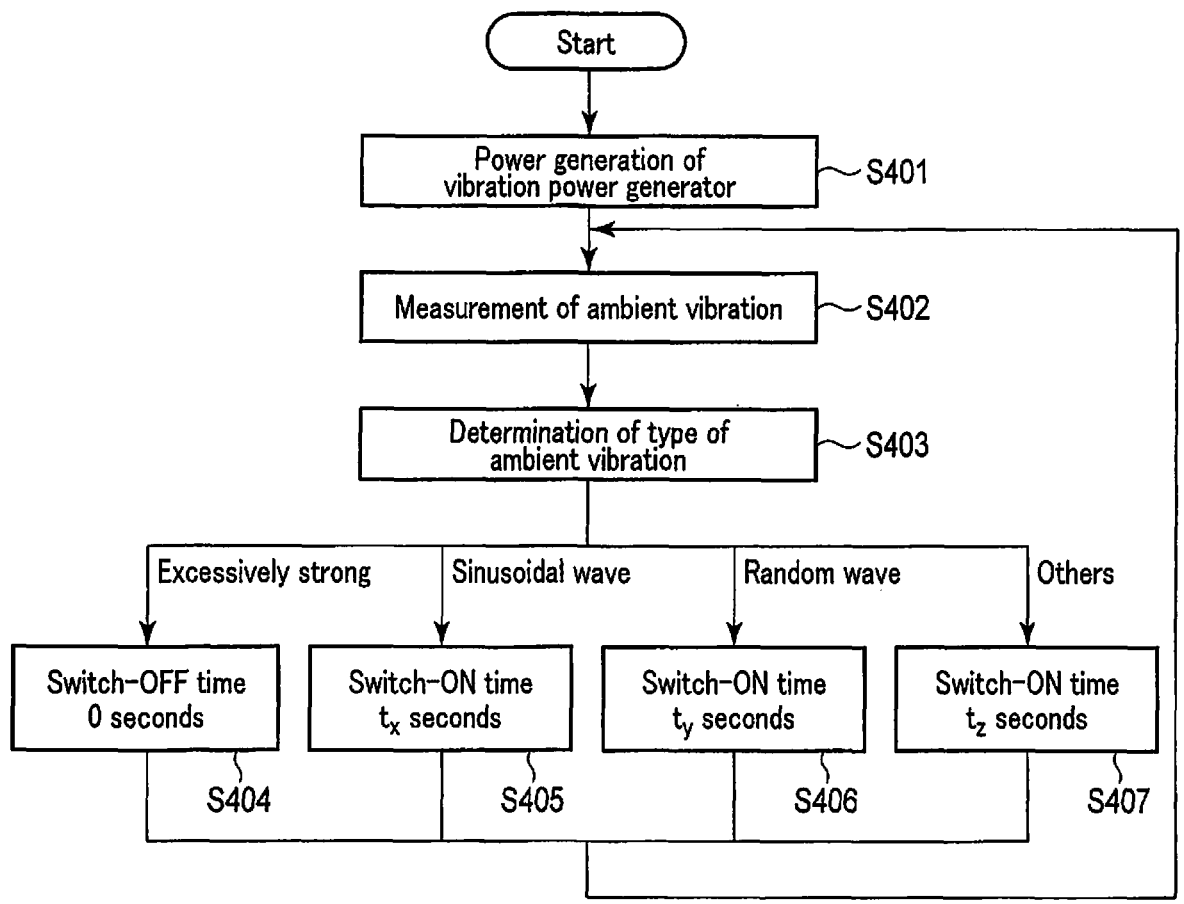
F I G. 4

POWER CONTROL CIRCUIT, POWER GENERATOR, AND POWER GENERATION SYSTEM

CROSS-REFERENCE TO RELATED APPLICATIONS

This application is based upon and claims the benefit of priority from Japanese Patent Application No. 2019-168331, filed Sep. 17, 2019, the entire contents of which are incorporated herein by reference.

FIELD

Embodiments described herein relate generally to a power control circuit, a power generator, and a power generation system.

BACKGROUND

Vibration power generators generate electric power by utilizing ambient vibrations (for example, vibrations from an automobile or a train, or vibrations produced when rain strikes the ground). The power generated by a vibration power generator shows promise as an alternative of a power source (for example, a battery) to be used in devices such as sensors.

As control methods for improving power generation performance or for extending the lifetime of the vibration power generator, maximum power point tracking control and displacement suppression control have been proposed. However, since these methods are sequential control, the problem of requiring time to transition to a desired status is involved.

BRIEF DESCRIPTION OF THE DRAWINGS

FIG. 1 is a block diagram illustrating a power generation system according to an embodiment.

FIG. 2A is a diagram illustrating an example of an electrical circuit combining a rectifying and smoothing circuit with a converter.

FIG. 3 is a diagram illustrating an example of the relationship between an estimation unit and training data.

FIG. 4 is a flowchart illustrating an operation sequence of the power generation system according to an embodiment.

DETAILED DESCRIPTION

Figure 2B:
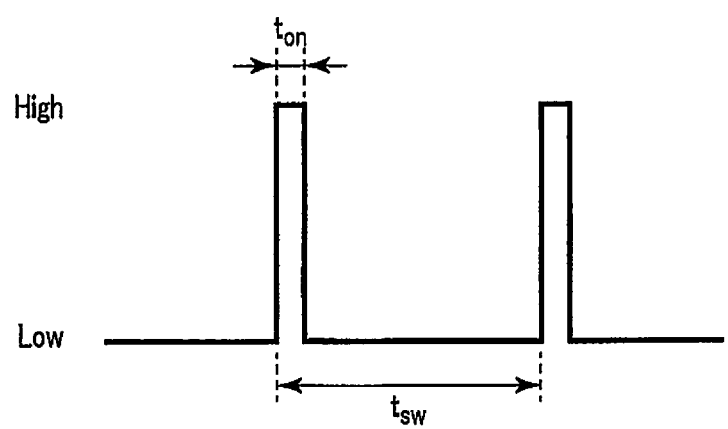
FIG. 2B is a diagram illustrating an example of a pulse signal for driving a converter.

According to one embodiment, a power control circuit includes a converter, a signal generating circuit, an estimation unit, and a controller. The converter includes a switching circuit and is configured to transform an output voltage from a power generator. The signal generating circuit is configured to transmit a signal the switching circuit. The estimation unit is configured to determine a switching operation condition based on vibration information indicative of a vibration applied to the power generator. The controller is configured to control an operation of the switching circuit based on the determined switching operation condition.

Hereinafter, embodiments will be described with reference to the accompanying drawings. Throughout the description of the embodiment below, the like elements will be denoted by the like reference symbols, and redundant descriptions will be omitted. The drawings are schematically or conceptually illustrated.

FIG. 1 schematically illustrates a power generation system 100 according to an embodiment. As shown in FIG. 1, the power generation system 100 includes a vibration power generator 101 and a power control circuit 110. The vibration power generator 101 is an example of the power generator. In the example shown in FIG. 1, the power control circuit 110 includes a rectifying and smoothing circuit 111, a converter 112, an estimation unit 113, a controller 114, and a signal generating circuit 115. The power generation system 110 is connected to a load (not shown), and supplies electric power to the load. The load is any device such as a sensor and is driven by the electric power supplied from the power generation system 100.

The vibration power generator 101 includes, for example, an electromagnetic induction element or a piezoelectric element, and converts mechanical energy from mechanical vibration due to an ambient vibration or the like into AC power, and outputs the AC power. In a structural example, the vibration power generator 101 includes a movable unit, and a stationary unit which movably supports the movable unit. For example, the movable unit includes a coil, and the stationary unit includes a magnet disposed inside the coil. When the vibration power generator 101 receives a vibration or vibrations, the movable unit oscillates. Accordingly, the magnet moves relative to the coil, and a magnetic flux that interlinks the coil changes with time. As a result, electromotive force is generated by electromagnetic induction. Thus, the vibration applied to the vibration power generator 101 are converted to AC power.

The rectifying and smoothing circuit 111 converts the AC power output from the vibration power generator 101 into DC power, and smooths the DC power. The rectifying and smoothing circuit 111 includes, for example, a rectifying circuit and a smoothing circuit. The rectifying circuit converts the AC power output from the vibration power generator into DC power. When the power generator is a vibration power generator, the DC power output from the rectifying circuit is normally pulsating power. The rectifying circuit includes, for example, one or more diodes. For example, the rectifying circuit may include a full-wave rectifier in which four diodes are bridge-connected. The smoothing circuit smooths the DC power output from the rectifying circuit. The smoothing circuit includes, for example, one capacitor. The smoothing circuit may include a plurality of capacitors. The smoothing circuit may also include a combination of a capacitor and an inductor. The smoothing circuit smooths a voltage by temporarily accumulating the current as charges, and then releasing the accumulated charges. Namely, the smoothing circuit is a kind of storage circuit that stores power.

The converter 112 includes a switching circuit (also called a switching element), and transforms the DC power output from the rectifying and smoothing circuit 111 based on a switching operation of the switching circuit. The switching circuit is driven by a pulse signal (square wave signal) from the signal generation circuit 115. The switching circuit includes, for example, a bipolar transistor or a metal-oxide semiconductor field-effect transistor (MOSFET). Power output from the converter 112 is supplied, as appropriate, to a load connected to the power generation system 100, for example, a device such as a sensor.

FIG. 2A illustrates an example of an electrical circuit combining the rectifying and smoothing circuit 111 with the converter 112. FIG. 2A illustrates an example in which the converter 112 is a buck-boost converter.

A buck-boost converter is a converter that is able to both raise and lower voltages using the switching of the switching circuit. As illustrated in FIG. 2A, the buck-boost converter includes a capacitor C, a switching circuit S, an inductor L, and a diode D. The output of the rectifying and smoothing circuit 111 is connected to one end of the switching circuit S. The other end of the switching circuit S is connected to the cathode of the diode D. The anode of the diode D is connected to the load. The inductor L is connected in parallel to the switching circuit S between the switching circuit S and the diode D. The capacitor C is connected in parallel to the diode D between the diode D and the load.

The switching circuit S is driven by a pulse signal as illustrated in FIG. 2B. The switching circuit S is in an ON state when the signal level of the pulse signal is high, and is in an OFF state when the signal level of the pulse signal is low. In FIG. 2B, the time duration for which the signal level of the pulse signal is high is a switch-ON time $t_{on}$. Further, in FIG. 2B, the period at which the signal level becomes high is a switching period $t_{sw}$. The duty cycle of the switching circuit S is determined by the switch-ON time $t_{on}$ and the switching period $t_{sw}$. The duty cycle is the ratio of the switch-ON time $t_{on}$ to the switching period $t_{sw}$. Depending on the duty cycle, the output voltage of the rectifying and smoothing circuit 111 is raised or lowered. An output voltage $v_{out}$ from the converter that has been raised or lowered is applied to the load.

Referring back to FIG. 1, the estimation unit 113 determines a switching operation condition based on vibration information. The switching operation condition indicates a condition to operate switching of the switching circuit in the converter 112. The switching operation condition may include a switch-ON time. The switching operation condition may include a switching period. The switching operation condition may include a duty cycle. In the following description, it is assumed that the switching period is constant and the switching operation condition determined by the estimation unit 113 is the switch-ON time. Details of specific processing in the estimation unit 113 will be described later.

The vibration information indicates a vibration applied to the vibration power generator 101. In one example, the vibration information is acquired by an acceleration sensor 120. The acceleration sensor 120 is attached to the vibration power generator 101, measures an acceleration of the vibration applied to the vibration power generator 101 to generate the vibration information. In another example, the vibration information is acquired by an acceleration estimation circuit (not shown). The acceleration estimation circuit estimates an acceleration of the vibration applied to the vibration power generator 101 by applying an inverse characteristics filter to an electric signal output from the vibration power generator 101. In place of or in addition to the acceleration, another characteristic, such as an angular velocity, may be measured or estimated. The acceleration sensor 120 or the acceleration estimation circuit corresponds to an acquisition unit configured to acquire vibration information.

The estimation unit 113 includes a hardware processor, such as a central processing unit (CPU), an application specific integrated circuit (ASIC), a field programmable gate array (FPGA), or a digital signal processor (DSP). The estimation unit 113 may further include a memory, such as a dynamic random access memory (DRAM) or a static random access memory (SRAM). Furthermore, the controller 113 may include a plurality of hardware processors or memories.

The controller 114 controls the switching operation of the switching circuit in the converter 112 based on the switching operation condition determined by the estimation unit 113. For example, the controller 114 changes the switch-ON time of a pulse signal for driving the switching circuit in the converter 112 based on the switching operation condition determined by the estimation unit 113. Specifically, the controller 114 causes the signal generating circuit 115 to generate a pulse signal having a duration time corresponding to the switch-ON time determined by the estimation unit 113 at a fixed switching period. The controller 114 may control (change) the switching period or the duty cycle instead of the switch-ON time. Details of the operation of the controller 114 will be described later.

The controller 114 includes a hardware processor, such as a CPU, an ASIC, an FPGA, or a DSP. The controller 114 may also include a memory, such as DRAM or a SRAM. Furthermore, the controller 114 may include a plurality of hardware processors or memories.

The signal generation circuit 115 generates a pulse signal with a switch-ON time designated by the controller 114, and outputs this pulse signal to the converter 112.

The power control circuit 110 is provided with processing circuitry including one or more hardware processors. The processing circuitry functions as the estimation unit 113 and the controller 114. Specifically, the processing circuitry is configured to determine the switching operation condition based on the vibration information received from the acceleration sensor 120, and to control the operation of the switching circuit in the converter 112 based on the determined switching operation condition.

The relationship between a circuit resistance viewed from the vibration power generator 101 and a switching operation condition will be explained. When the rectifying and smoothing circuit 111 and the buck-boost converter shown in FIG. 2A are connected to the vibration power generator 101, the circuit resistance $r_{circuit}$ viewed from the vibration power generator 101 is expressed as in Equation (1).

$$r_{circuit} = \frac{t_{sw}}{t_{on}^2} l_{dc} \qquad \text{(Equation 1)}$$

where $l_{dc}$ is the inductance of the inductor L. Generally, the inductance $l_{dc}$ is a fixed value that is determined during design time. Thus, the circuit resistance $r_{circuit}$ may be controlled by controlling the switching period $t_{sw}$ or the switch-ON time $t_{on}$. For example, if the switching period $t_{sw}$ is uniquely specified, the circuit resistance $r_{circuit}$ can be controlled by controlling only the switch-ON time $t_{on}$.

The estimation unit 113 will be described with reference to FIG. 3. The estimation unit 113 may determine the switching operation condition using a plurality of switching operation conditions that are prepared in advance. For example, the switching operation conditions are respectively associated with a plurality of types of vibration. Examples of the types of vibration are a sinusoidal wave, a random wave, etc. The estimation unit 113 determines a type of the vibration applied to the vibration power generator 101 based on the vibration information, and selects the switching operation condition associated with the type of vibration from the switching operation conditions prepared in advance.

The estimation unit 113 may include a model such as a neural network. The model is trained by using training data indicative of the types of vibration and switching operation conditions respectively corresponding to the types of vibration. In the example shown in FIG. 3, the training data include data indicative of a probability distribution of the switching operation conditions for each type of vibration. For example, in the probability distribution relating to vibration B, the probability of the switching operation condition A is 0, the probability of the switching operation condition B is 1, and the probability of the switching operation condition C is 0.

The switching operation conditions prepared in advance may include a switching operation condition in which the switching circuit is in a fully conductive state. This switching operation condition is referred to as a full-conduction condition. The full-conduction condition is a condition in which the switch-OFF time is 0 seconds, namely, that the switch-ON time is equal to the switching period.

The switching operation conditions prepared in advance include a switching operation condition in which the switching circuit is in a non-fully conductive state. This switching operation condition is referred to as a non-full-conduction condition. In the non-full-conduction condition, the switch-ON time is shorter than the switching period.

The neural network trained using the training data shown in FIG. 3, upon receipt of any vibration information, outputs a probability distribution of the switching operation conditions (specifically, the respective probabilities of the switching operation conditions A, B and C). The estimation unit 113 selects a switching operation condition from the switching operation conditions based on the probability distributions output from the neural network. For example, the estimation unit 113 selects a switching operation condition of the highest probability.

Next, the operation example of the power generation system 100 according to the present embodiment will be described.

FIG. 4 illustrates an example of the operation sequence of the power generation system 100.

In step S401 shown in FIG. 4, the vibration power generator 101 generates electric power upon receipt of an ambient vibration. At the start of power generation, the circuit resistance $r_{circuit}$ may be set to an optimum resistance $r_{r,sin}$ when the frequency of the ambient vibration conforms to the natural frequency of the vibration power generator 101 and the waveform of the ambient vibration is a sinusoidal wave. The optimum resistance refers to a circuit resistance that maximizes the power output from the vibration power generator 101. When the frequency of the ambient vibration conforms to the natural frequency of the vibration power generator 101 and the waveform of the ambient vibration is a sinusoidal wave, the optimum resistance $r_{r,sin}$ is expressed by Equation 2.

$$r_{r,sin} = \frac{\sqrt{k_v^4 + 2c_m r_c k_v^2 + c_m^2(r_c^2 + \omega_n^2 l_c^2)}}{c_m} \quad \text{(Equation 2)}$$

where $k_v$ represents the voltage constant of the vibration power generator 101, cm represents the mechanical damping coefficient of the vibration power generator 101, $r_c$ represents the resistance of a coil for use in power generation in the vibration power generator 101, $l_c$ represents the inductance of the coil for use in power generation, and con represents the natural frequency of the vibration power generator 101.

If it is assumed that the inductance component is sufficiently small, the optimum resistance $r_{r,sin}$ is expressed by Equation 3.

$$r_{r,sin} = r_c + \frac{k_v^2}{c_m} \quad \text{(Equation 3)}$$

At the start of power generation, the circuit resistance $r_{circuit}$ may be set to an optimum resistance $r_{r,random}$ when the waveform of the ambient vibration is a random wave. The optimum resistance $r_{r,random}$ when the waveform of the ambient vibration is a random wave is expressed by Equation 4.

$$r_{r,random} = \sqrt{r_c^2 + \frac{k_v^2 r_c}{c_m}} \quad \text{(Equation 4)}$$

In step S402, the acceleration sensor 120 measures acceleration of the ambient vibration applied to the vibration power generator 101.

In step S403, the estimation unit 113 determines the type of ambient vibration based on the vibration information output from the acceleration sensor 120.

If the estimation unit 113 determines that the ambient vibration are excessively strong, the controller 114 changes the switch-OFF time to 0 seconds in step S404, and the switching circuit of the converter 112 is in the fully conductive state. As a result, the vibration power generator 101 is short-circuited, and the electrical damping force is the greatest. Therefore, the amplitude of oscillation of the movable unit in the vibration power generator 101 can be small. This can, for example, prevent the movable unit from colliding with the stationary unit. Accordingly, the vibration power generator 101 is prevented from malfunctioning.

If the estimation unit 113 determines that the waveform of the ambient vibration is a sinusoidal wave, the controller 114 changes the switch-ON time to $t_x$ seconds in step S405. The value of $t_x$ is determined, for example, based on Equations 1 and 2, or Equations 1 and 3.

If the estimation unit 113 determines that the waveform of the ambient vibration is a random wave, the controller 114 changes the switch-ON time to $t_y$ seconds in step S406. The value of $t_y$ is determined, for example, based on Equations 1 and 4.

If the estimation unit 113 determines that the ambient vibration are other than the above, the controller 114 changes the switch-ON time to $t_z$ seconds in step S407.

The operation sequence shown in FIG. 4 may be carried out only once between the start and the end of power generation by the vibration power generator 101, or a plurality of times for each predetermined situation.

The ambient vibration do not necessarily completely match any of the types of vibration prepared in advance. Therefore, the estimation unit 113 may output an ambiguous determination result. For example, the estimation unit 113 outputs a determination result that the probability of the switch-ON time being $t_x$ is $P_x$, and the probability of the switch-ON time being $t_y$ is $P_y$. In this case, the estimation unit 113 combines the switch-ON times $t_x$ and $t_y$ at the probabilities $P_x$ and $P_y$, thereby determining the switch-ON time. For example, the controller 114 determines the switch-ON time $t_{xy}$ based on Equation 5.

$$t_{xy} = \frac{P_x}{P_x + P_y}t_x + \frac{P_y}{P_x + P_y}t_y \qquad \text{(Equation 5)}$$

Even if the length of the sequence ($P_x$, $P_y$, $P_z$, . . . ) of the probability distribution is three or more, the switch-ON time can be calculated in the same manner as in the case of using Equation 5.

As described above, the power control circuit 110 of the power generation system 100 of the present embodiment changes the switching operation conditions in accordance with the acceleration of the ambient vibration applied to the vibration power generator 101. Accordingly, the amplitude of displacement of the movable part of the vibration power generator 101 can be suppressed, and electrical power can be generated under an optimum switching operation condition. Thus, the power control circuit 110 can improve the power generation performance and can extend the lifetime of the vibration power generator 101.

The power control circuit 110 according to the embodiment described above may be included in the power generator. The power generator according to other embodiments includes a power generation unit (power generation circuit) that converts the applied mechanical vibration to electric power, and a power control circuit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power control circuit comprising:
a converter including a switching circuit configured to be switched ON and OFF alternately, the converter being configured to transform an output voltage from a power generator based on a switching operation of the switching circuit;
a signal generating circuit configured to generate a signal for driving the switching circuit and apply the generated signal to the switching circuit;
an estimation unit configured to determine a switching operation condition based on vibration information indicative of a vibration applied to the power generator and using a plurality of switching operation conditions prepared in advance, the switching operation condition and the plurality of switching operation conditions each including information for specifying a duty cycle indicating a fraction of a period in which the switching circuit is ON; and
a controller configured to control the switching operation of the switching circuit based on the determined switching operation condition.

2. The power control circuit according to claim 1, wherein the estimation unit is trained by using training data indicative of types of vibration and switching operation conditions corresponding to the types of vibration.

3. The power control circuit according to claim 1, further comprising an acquisition unit configured to acquire the vibration information.

4. The power control circuit according to claim 3, wherein the acquisition unit includes an acceleration sensor configured to measure an acceleration of the vibration applied to the power generator.

5. The power control circuit according to claim 3, wherein the acquisition unit is configured to estimate an acceleration of the vibration applied to the power generator by applying an inverse characteristics filter to an electric signal output from the power generator.

6. The power control circuit according to claim 1, wherein:
the plurality of switching operation conditions include a first switching operation condition in which the switching circuit is in a fully conductive state, and a second switching operation condition in which the switching circuit is in a non-fully conductive state.

7. The power control circuit according to claim 6, wherein the second switching operation condition is determined based on an optimum resistance which is a circuit resistance that maximizes power generated by the power generator.

8. The power control circuit according to claim 6, wherein the estimation unit is configured to calculate a probability distribution of the switching operation conditions based on the vibration information, and to determine the switching operation condition by combining the switching operation conditions in the probability distribution.

9. The power control circuit according to claim 1, wherein the estimation unit includes a neural network.

10. A power generator comprising:
the power control circuit according to claim 1; and
a power generation unit configured to convert a vibration to electric power.

11. A power generation system comprising:
the power control circuit according to claim 1; and
a power generator configured to convert a vibration to electric power.

* * * * *